(12) United States Patent
Comeau et al.

(10) Patent No.: US 7,079,233 B1
(45) Date of Patent: Jul. 18, 2006

(54) SYSTEM AND METHOD FOR DETERMINING THE ALIGNMENT QUALITY IN AN ILLUMINATION SYSTEM THAT INCLUDES AN ILLUMINATION MODULATOR

(76) Inventors: Bryan Comeau, 106 Maple Ave., Atkinson, NH (US) 03811; Philip A. Rombult, 4 Washington St., Boxford, MA (US) 01921; Jeffrey Knox, 480 Chestnut St., Lynnfield, MA (US) 01940

(*) Notice: Subject to any disclaimer, the term of this patent is extended or adjusted under 35 U.S.C. 154(b) by 373 days.

(21) Appl. No.: 10/649,530

(22) Filed: Aug. 27, 2003

(51) Int. Cl.
*G01B 11/26* (2006.01)
*G02B 26/00* (2006.01)

(52) U.S. Cl. .................. 356/139.04; 356/400; 359/237
(58) Field of Classification Search .......... 356/139.04, 356/139.07, 399, 400; 359/237–239; 398/87, 398/93, 101
See application file for complete search history.

(56) References Cited

U.S. PATENT DOCUMENTS

| | | |
|---|---|---|
| 5,072,239 A | 12/1991 | Mitcham |
| 5,081,597 A | 1/1992 | Kowalski |
| 5,323,002 A | 6/1994 | Sampsell |
| 5,842,088 A | 11/1998 | Thompson |
| 6,188,427 B1 | 2/2001 | Anderson et al. |
| 6,369,936 B1 | 4/2002 | Moulin |
| 6,414,706 B1 | 7/2002 | Allen |
| 6,479,811 B1 | 11/2002 | Kruschwitz |
| 6,650,353 B1 | 11/2003 | Comeau |
| 6,882,457 B1 * | 4/2005 | Comeau et al. ............. 359/239 |
| 6,898,377 B1 * | 5/2005 | LeHoty et al. ................ 398/87 |
| 2002/0196245 A1 | 12/2002 | Markis |

FOREIGN PATENT DOCUMENTS

| | | |
|---|---|---|
| EP | 437766 A2 | 7/1991 |
| EP | 1069759 | 1/2001 |
| EP | 0791863 | 10/2001 |
| EP | 1293348 | 3/2003 |
| WO | WO 91/15843 | 10/1991 |
| WO | WO 00/69631 | 11/2000 |

* cited by examiner

*Primary Examiner*—Layla G. Lauchman
(74) *Attorney, Agent, or Firm*—William E. Hilton; Robert A. Sabourin

(57) ABSTRACT

An alignment detection system is disclosed for determining whether a modulated illumination field in an imaging system employing an illumination modulator is mis-aligned. The alignment detection system includes a modulator adjustment unit for providing a test pattern on the illumination modulator, a detector for receiving a modulated illumination field from the illumination modulator, a sampling unit for determining at least two sample values (A and C) for each of two areas of the modulated illumination field respectively, and an evaluation unit for determining whether the value |A−C| is greater than a threshold value.

16 Claims, 4 Drawing Sheets

SYSTEM AND METHOD FOR DETERMINING THE ALIGNMENT QUALITY IN AN ILLUMINATION SYSTEM THAT INCLUDES AN ILLUMINATION MODULATOR

BACKGROUND

The invention generally relates to imaging systems, and relates in particular to imaging systems that employ an illumination modulator.

Imaging system such as those disclosed in U.S. Pat. No. 6,433,934, may include an illumination source, a field lens system, an illumination modulator, imaging optics and an imaging surface. During imaging, the field lens system directs the illumination field onto the light modulator and the light modulator reflects the illumination field toward the imaging surface in one mode and reflects the illumination field away from the imaging surface in another mode. For example, the modulator may include a Grating Light Valve (GLV) as sold by Silicon Light Machines of Sunnyvale, Calif., and the system may direct via the imaging optics either the zero order reflection or the first order reflection toward the imaging surface in various embodiments.

Many imaging systems employ an illumination field that is generally in the shape of a line of illumination, permitting a line of picture elements (or pixels) to be imaged simultaneously. It has been discovered, however, that certain modulators may become mis-aligned during manufacturing or use, detracting from the performance of the system and quality of the recorded images. Such mis-alignment may result in the line of illumination being shifted, rotated or bent (e.g., into a curve) with respect to the desired illumination line position in the imaging system.

There is a need, therefore, for a system and method for efficiently and economically determining whether a modulated illumination field from a light modulator is mis-aligned.

SUMMARY

The invention provides an alignment detection system for determining whether a modulated illumination field in an imaging system employing an illumination modulator is mis-aligned. The alignment detection system includes a modulator adjustment unit for providing a test pattern on the illumination modulator, a detector for receiving a modulated illumination field from the illumination modulator, a sampling unit for determining at least two sample values (A and C) for each of two areas of the modulated illumination field respectively, and an evaluation unit for determining whether the value |A−C| is greater than a threshold value.

BRIEF DESCRIPTION OF THE ILLUSTRATED EMBODIMENTS

The following description may be further understood with reference to the accompanying drawings in which.

The drawings are for illustrative purposes only and are not to scale.

DETAILED DESCRIPTION OF THE ILLUSTRATED EMBODIMENTS

Figure 1:
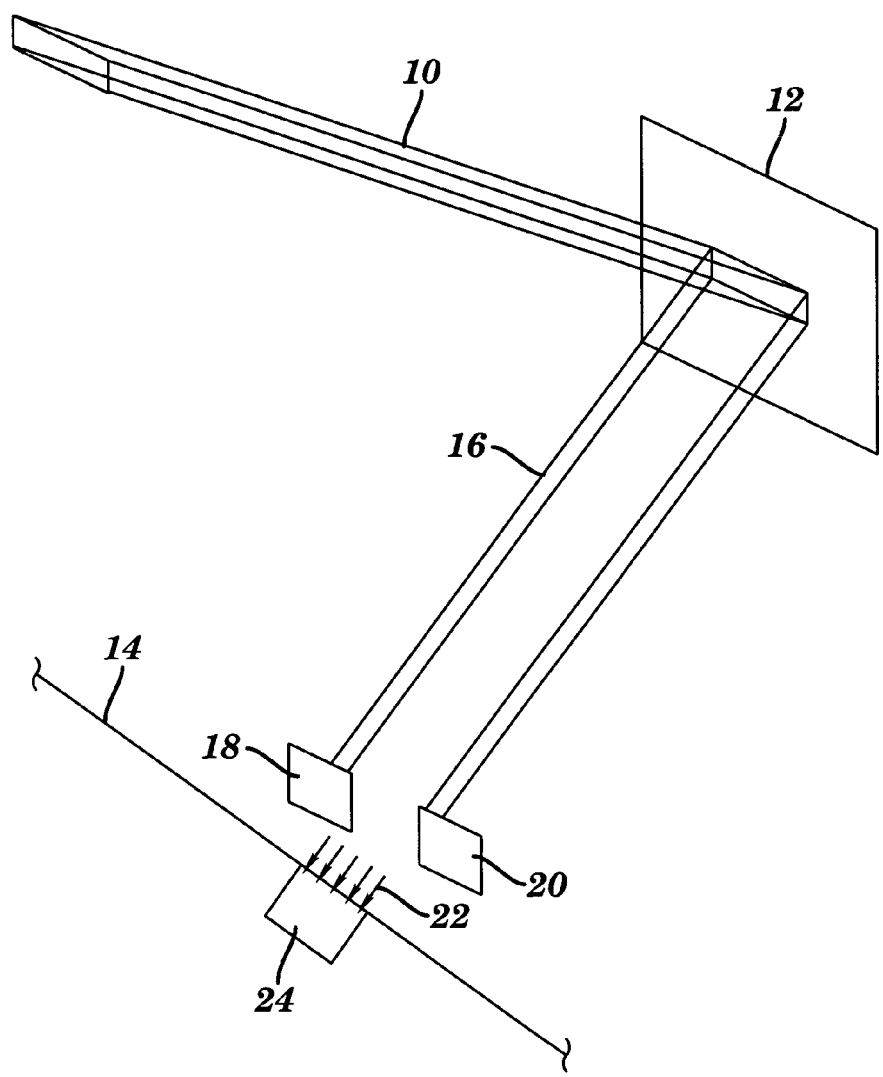
FIG. 1 shows an illustrative diagrammatic view of an imaging system employing an alignment detection system in accordance with an embodiment of the invention.

As shown in FIG. 1, an imaging system (e.g., a thermal imaging system) in accordance with an embodiment of the invention may include an illumination field 10, an illumination modulator 12 and an imaging surface 14 (e.g., an external imaging drum). The modulator receives the illumination field 10 via a field lens system (not shown) and directs a modulated illumination field 16 toward the imaging surface via imaging optics (not shown). The illumination source, field lens system, modulator, imaging optics and imaging surface may be as disclosed in U.S. Pat. No. 6,433,934, the disclosure of which is hereby incorporated by reference. The modulator may include a Grating Light Valve (GLV) as sold by Silicon Light Machines of Sunnyvale, Calif.

The system also includes a pair of block plates 18 and 20 that prevent the end-most portions of the illumination field from reaching the imaging surface during normal zero axis imaging while permitting the central portion 22 of the modulated illumination field 16 to reach the imaging surface. A detector 24 is also placed at the image plane of the imaging surface adjacent imagable media.

Figure 2:
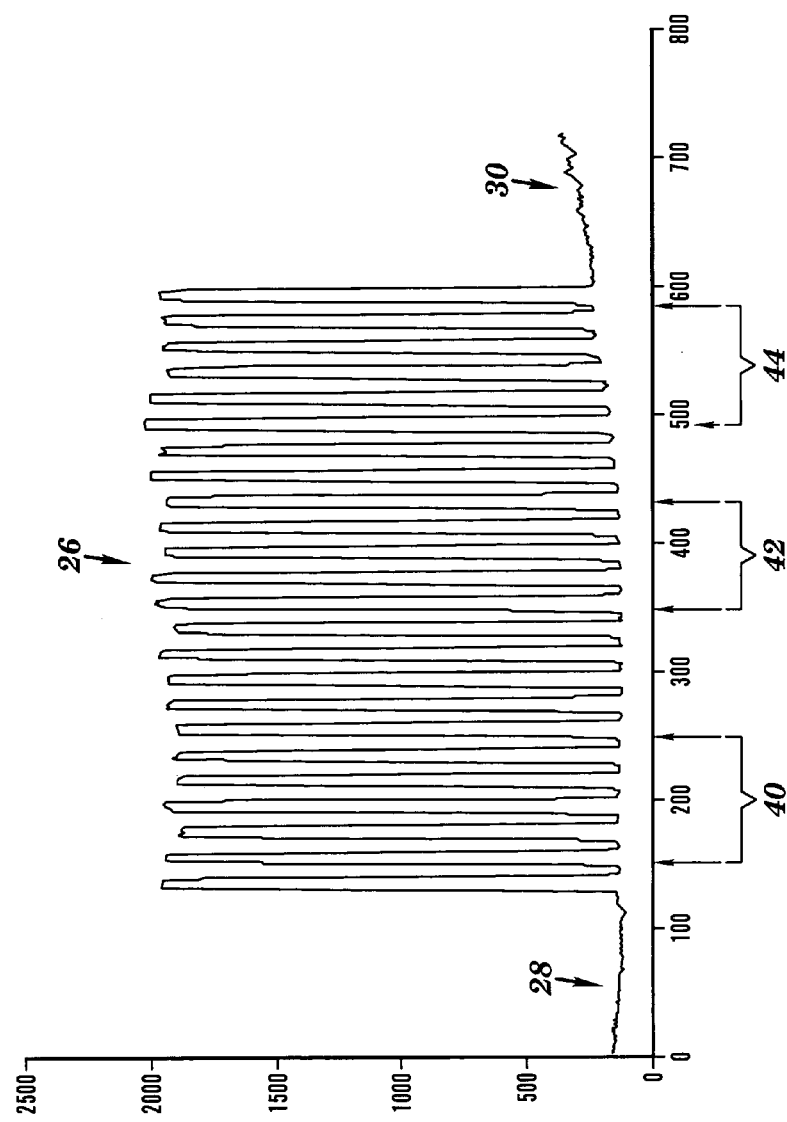
FIG. 2 shows an illustrative graphical representation of a scan image.

As shown in FIG. 2, during use a modulated illumination field 26 may be defined by non-modulated areas 28 and 30 on either side of the field 26. The modulated areas are created using a modulator test pattern of 10 shutters on followed by 10 shutters off etc. In a zero order imaging system for example, the non-modulated areas are formed by activating the associated portions of the light modulator to deflect the incident light into the +/− first orders etc. As shown in FIG. 2, the off states at 28 and 30 may become mis-aligned or otherwise incorrect over time. Also, the contrast quality will be adversely affected by a mis-alignment of the illumination line.

During a single alignment detection scan in a slow scan direction (e.g., along the longitudinal length of imaging surface), the detector (e.g., having a slit opening of about 10 microns), may receive an illumination field as shown in FIG. 2. The detector 24 is moved across the entire field 16 during alignment detection scan. In accordance with an embodiment, samples are taken at three defined periods as shown at 40, 42 and 44. The end-most sample areas are preferably located within about 20% and more preferably about 15% of the distance from each of the ends of the modulated illumination field. During each of these sample periods, 100 samples are taken and analyzed (about 10 samples per GLV shutter), and the average sample value for each period is then determined. For example, the average value for the sample period 40 may be designated as average sample A, and the average value for the sample period 42 may be designated as average sample B, and the average value for the sample period 44 may be designated as average sample C. The system may determine whether one of the ends of the illumination field 32 is too high (due to mis-alignment) by comparing A and C. For example, the system may determine the difference between A and C, and then compare that difference with a threshold value.

Figure 3:
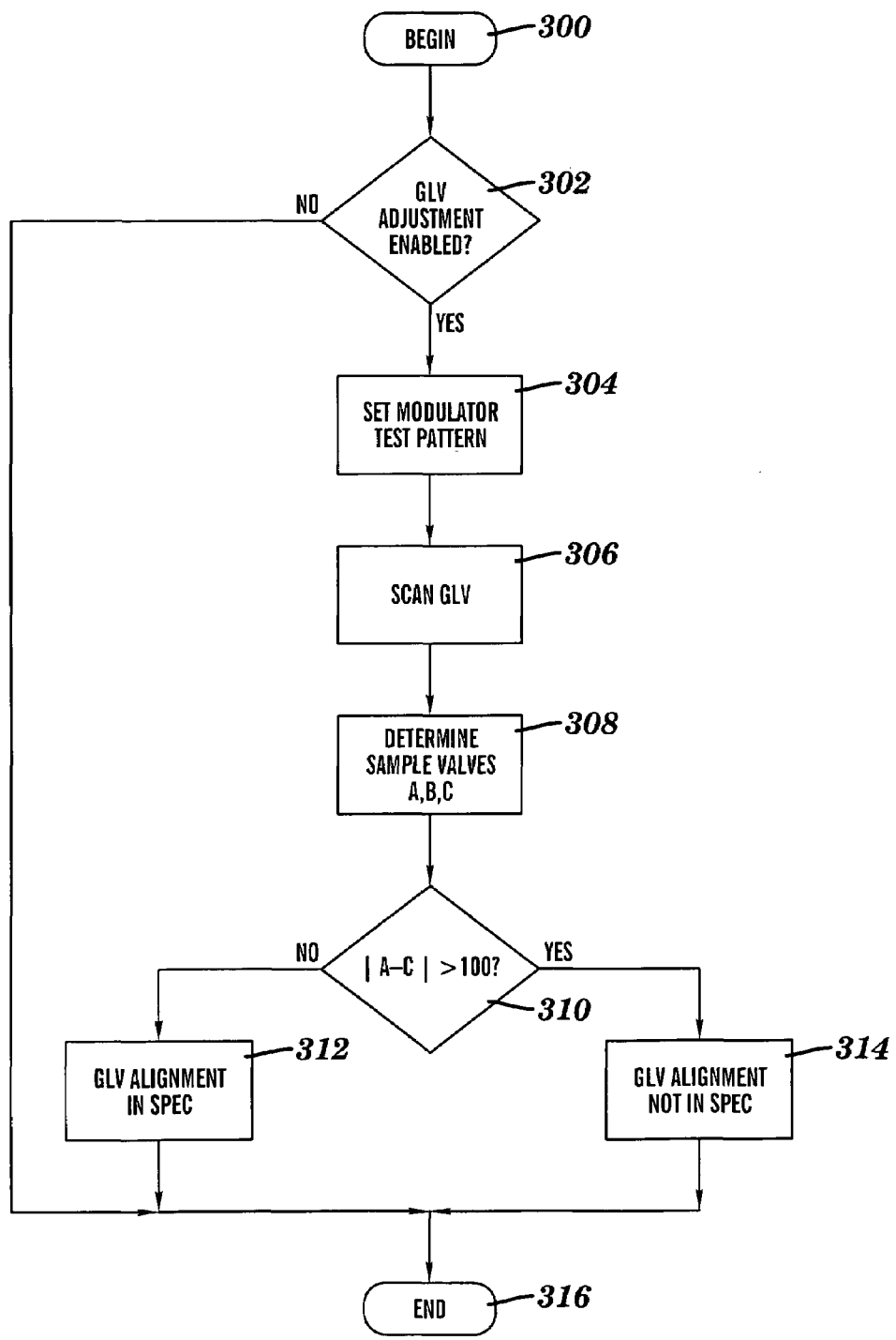
FIG. 3 shows an illustrative diagrammatic view of a process in accordance with an embodiment of the invention.

In particular and as shown in FIG. 3, a process in accordance with an embodiment of the invention may begin (step 300) by determining whether the GLV adjustment routine is enabled (step 302). This routine permits the voltage levels on each ribbon in a GLV to be optimally adjusted. If the routine is not enabled, the process ends (step 316), and if the routine is enabled, the process sets the modulator to provide the test pattern (step 304). The process then scans the GLV (step 306) and calculates the data points in three regions and determines the average value (A, B and C) for the respective regions (step 308). The process then determines (step 310) whether the following relationship exists:

$$|A-C|>100$$

If the above relationship does not exist, then the process records that the GLV is in alignment (step 312) and ends (step 316). If the above relationship does exist, then the process records that the GLV is not in alignment (step 314) and the process ends (step 316). If the GLV is determined to be not in alignment, then the imaging system should be shut down so that the alignment may be manually corrected. In further embodiments, the process may evaluate the value B as well in determining whether the GLV is within proper alignment parameters.

Figure 4:
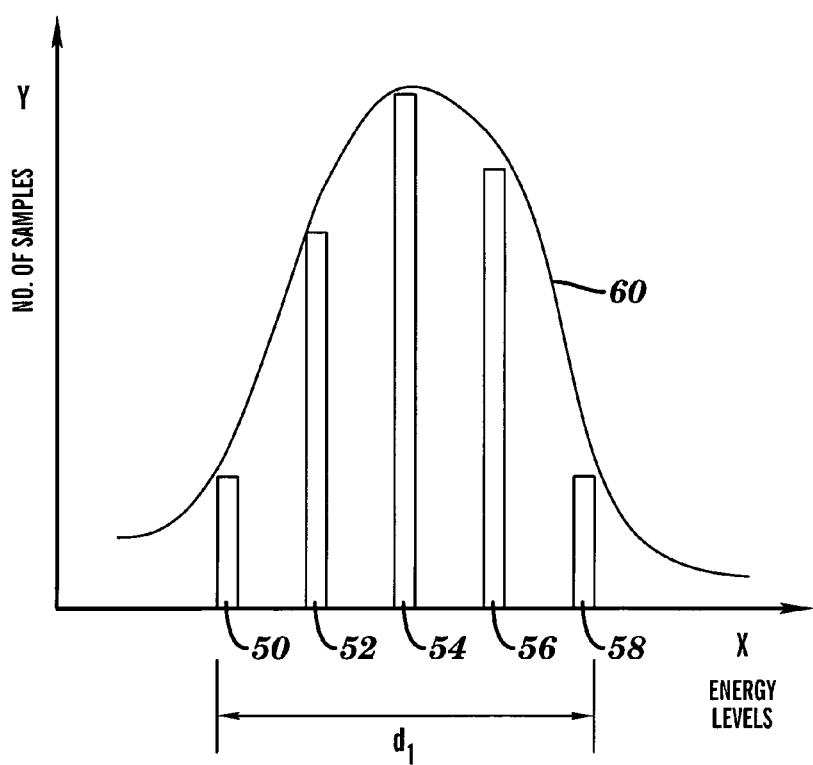
FIG. 4 shows an illustrative graphical representation of the diffracted energy levels versus the number of segments at each energy level in accordance with a further embodiment of the invention.

In accordance with another embodiment of the invention, an error determination process may involve dividing the length of the GLV into a plurality of segments and grouping the energy levels in to a plurality of groups. A histogram is then formed where the horizontal axis (X-axis) shows the diffracted energy levels and the vertical axis (Y-axis) shows the number of segments at each energy level. For example, FIG. 4 shows such a histogram wherein the GLV is divided into five groups as shown at 50, 52, 54, 56 and 58. The groups define a histogram 60 and the quality of the alignment may be determined by evaluating the difference between the highest and lowest energy levels $d_l$ as shown. The shape of the histogram 60 may also provide helpful information regarding the quality of the GLV and line illumination components. For example, if one portion of the GLV were not functioning properly, then the histogram may be tightly packed in one area with some values well outside of a normal distribution.

Those skilled in the art will appreciate that numerous modifications and variations may be made to the above disclosed embodiments without departing from the spirit and scope of the invention.

That which is claimed is:

1. An alignment detection system for determining whether a modulated illumination field in an imaging system employing an illumination modulator is mis-aligned, said alignment detection system comprising:

modulator adjustment means for providing a test pattern on the illumination modulator;

a detector for receiving a modulated illumination field from said illumination modulator;

sampling means for determining at least two sample values (A and C) for each of two areas of said modulated illumination field respectively; and evaluation means for determining whether the value |A−C| is greater than a threshold value.

2. The alignment detection system as claimed in claim 1, wherein said sample values A and C are for areas that are within about 20% of each end of the modulated illumination field.

3. The alignment detection system as claimed in claim 1, wherein said imaging system provides zero order imaging.

4. The alignment detection system as claimed in claim 1, wherein each of said sample values (A and C) is provided by an average of about 100 sample values.

5. The alignment detection system as claimed in claim 1, wherein said illumination modulator includes a grating light valve and said test pattern on said illumination modulator provides ten shutters followed by ten shutters off across the modulator.

6. An alignment detection system for determining whether a modulated illumination field in an imaging system employing an illumination modulator is mis-aligned, said alignment detection system comprising:

modulator adjustment means for providing a periodic alternating test pattern on the illumination modulator;

a detector for receiving a modulated illumination field from said illumination modulator;

sampling means for determining at least two average sample values (A, B and C) for each of two areas of said modulated illumination field respectively; and evaluation means for determining whether one of the values |A−B|, |A−C|, or |B−C| is greater than a threshold value.

7. The alignment detection system as claimed in claim 6, wherein said sample values A and C are for areas that are within about 20% of each end of the modulated illumination field.

8. The alignment detection system as claimed in claim 6, wherein said imaging system provides zero order imaging.

9. The alignment detection system as claimed in claim 6, wherein each of said sample values (A, B and C) is provided by an average of about 100 sample values.

10. The alignment detection system as claimed in claim 6, wherein said illumination modulator includes a grating light valve and said test pattern on said illumination modulator provides ten shutters followed by ten shutters off across the modulator.

11. A method of detecting whether a modulated illumination field in an imaging system is mis-aligned, said method comprising the steps of:

providing a test pattern on the illumination modulator;

receiving a modulated illumination field from said illumination modulator at a detector;

determining at least two sample values (A and C) for each of two areas of said modulated illumination field respectively; and determining whether the value |A−C| is greater than a threshold value.

12. The method as claimed in claim 11, wherein said sample values A and C are for areas that are within about 20% of each end of the modulated illumination field.

13. The method as claimed in claim 11, wherein said imaging system provides zero order imaging.

14. The method as claimed in claim 11, wherein each of said sample values (A and C) is provided by an average of about 100 sample values.

15. The method as claimed in claim 11, wherein said illumination modulator includes a grating light valve and said test pattern on said illumination modulator provides ten shutters followed by ten shutters off across the modulator.

16. An error detection system for determining whether a modulated illumination field in an imaging system employing an illumination modulator is in error, said error detection system comprising:

modulator adjustment means for providing a test pattern on the illumination modulator;

a detector for receiving a modulated illumination field from said illumination modulator;

sampling means for obtaining a plurality of sample values of said modulated illumination field; and evaluation means for determining an overall alignment quality by comparing a width of a histogram generated by the plurality of sample values with a threshold value.

* * * * *